United States Patent [19]
Kolomeitsev

[11] Patent Number: 5,668,430
[45] Date of Patent: Sep. 16, 1997

[54] DUAL-SECTIONED SWITCHED RELUCTANCE MOTOR

[75] Inventor: Sergei F. Kolomeitsev, Sylvania, Ohio

[73] Assignee: Dana Corporation, Toledo, Ohio

[21] Appl. No.: 634,106

[22] Filed: Apr. 17, 1996

[51] Int. Cl.⁶ .......................... H02K 1/22; H02K 16/00; H02K 17/00
[52] U.S. Cl. .................. 310/266; 310/114; 310/166
[58] Field of Search .................. 310/162–165, 310/166, 168, 114, 266

[56] References Cited

U.S. PATENT DOCUMENTS

| | | | |
|---|---|---|---|
| 3,171,049 | 2/1965 | Jarret et al. | 310/114 |
| 3,510,699 | 5/1970 | Fredrickson | 310/114 |
| 3,751,696 | 8/1973 | Morreale | 310/49 R |
| 3,783,313 | 1/1974 | Mathur | 310/49 R |
| 4,048,531 | 9/1977 | Buess et al. | 310/49 R |
| 4,488,069 | 12/1984 | Field, II | 310/49 A |
| 4,626,719 | 12/1986 | Foster | 310/49 R |
| 4,975,608 | 12/1990 | Aspden | 310/114 |
| 5,047,680 | 9/1991 | Torok | 310/156 |
| 5,124,606 | 6/1992 | Eisenbeis | 310/114 |
| 5,168,190 | 12/1992 | Bahn | 310/166 |
| 5,281,879 | 1/1994 | Satake et al. | 310/114 |

Primary Examiner—Steven L. Stephan
Assistant Examiner—Michael Wallace, Jr.
Attorney, Agent, or Firm—Dykema Gossett PLLC

[57] ABSTRACT

A switched reluctance motor includes a stator defining a plurality of radially-inwardly-extending poles and a rotor defining a plurality of radially-outwardly-extending poles. The poles of the stator and the rotor are respectively divided into at least two longitudinal sections, with each pole section featuring a different shape when viewed in radial cross-section. The shape of one rotor pole section is such as to subdivide the pole into three teeth, namely, a central tooth flanked on either side by a side tooth, further characterized in that the shape of the central and side teeth are symmetric relative to a radius bisecting the central tooth. In a preferred embodiment, the circumferential spacing between the central tooth and each side tooth of one rotor pole is less than the circumferential spacing between the opposed side teeth of adjacent rotor poles.

24 Claims, 3 Drawing Sheets

DUAL-SECTIONED SWITCHED RELUCTANCE MOTOR

FIELD OF THE INVENTION

The present invention relates to electric machines having a stator and a rotor, wherein the poles of the stator and rotor are each divided into a plurality of longitudinal sections, with each pole section featuring a different pole shape when viewed in radial cross-section, thereby providing a nominal torque profile for each machine phase comprising the combined magnetic interactions of respective longitudinal pole sections of the stator and the rotor.

BACKGROUND OF THE INVENTION

The prior art teaches electric machines, such as switched reluctance motors, which operate on the basis of varying reluctance in their several magnetic circuits. Typically, such machines are doubly salient, that is, each machine has poles on both its stator and its rotor. The stator poles are typically encompassed by electric windings to form the phases of the machine and, in a common configuration, the stator windings on diametrically opposite poles are connected in series to form one machine phase. The rotor's poles are likewise disposed about the rotor's periphery in diametrical pairs.

When a stator phase is energized, the resulting magnetic field tends to urge the nearest rotor pole pair toward an aligned position with the poles of the energized stator phase, thereby applying a torque to the rotor whose profile is itself dependent upon several factors, including the shapes of the poles and their relative rotational positions, and the manner in which the stator phase is itself energized, e.g., the current applied to the stator windings. By energizing consecutive stator phases in succession, and in a cyclical fashion, the rotor may be urged to rotate continuously by virtue of the resulting overlapping torque profiles.

Unfortunately, the nominal torque profile for each stator phase is such that the overlapping torque profiles themselves combine to produce a varying overall torque output for the machine. In response, the prior art teaches varying the amplitude of the electric current applied to each stator winding as a function of the relative angular position of the rotor (sometimes referred to as "current mapping"), thereby generating machine phase torque profiles which, when combined, provide a nearly constant machine torque output. This prior art approach, however, requires additional electronic circuitry with which to sense the relative angular position of the rotor and to modulate the applied current in response thereto. Such additional circuitry greatly increases the cost and complexity of the resulting machine.

Thus, there is a need to provide an electrical machine that reduces or eliminates one or more problems as described above.

SUMMARY OF THE INVENTION

In accordance with the present invention, an electric machine comprises an annular stator defining a plurality of radially-inwardly-extending poles, wherein at least one stator pole is divided into two longitudinal sections of respective cross-sectional shape, with the shape of the first stator pole section being different from the shape of the second stator pole section. The machine further includes a rotor supported for rotation within the stator and defining a plurality of radially-outwardly-extending poles, wherein at least one rotor pole is divided into two longitudinal sections of respective cross-sectional shape, the shape of the first rotor pole section being different from the shape of the second rotor pole section, with the shape of the second rotor pole section further characterized by three teeth which preferably project radially-outwardly the same radial distance.

In a preferred embodiment, the shape of the second rotor pole section is further characterized in that the first tooth is centered about a radial line bisecting the rotor pole and is otherwise symmetrical thereabout. Most preferably, the shape of the second rotor pole section is further characterized in that the respective circumferential spacing between the teeth on a given rotor pole is greater than the circumferential spacing between the adjacent teeth of adjacent rotor poles.

In accordance with the present invention, when the divided stator poles of a given machine phase are energized, as through use of a conventional phase sequencer, the magnetic interaction between the energized stators first pole sections and the first pole sections of divided rotor poles positioned within 180 electrical degrees thereof generates a torque acting only in a first direction as each main rotor pole section is urged toward alignment with its respective energized main stator pole section. Significantly, however, the magnetic interaction between the energized stators' second pole sections and the second pole sections of those divided rotor poles generates a torque acting at times in the first direction, and at other times in a second direction opposite the first direction, as each second rotor pole section is urged toward alignment with its respective energized second stator pole section. More specifically, the magnetic interaction between the energized second stator pole section and the second rotor pole section, as the latter is urged from an unaligned position with respect to the former toward an aligned position therewith, is characterized in that the torque first rises, from a near-zero value acting in the first direction proximate the unaligned position, to a first peak value acting in the first direction, then falls to zero value, then rises to a second peak value acting in the second direction, then falls to zero value, then rises to a third peak value acting in the first direction, and then falls to a near-zero value acting in the first direction proximate to the aligned position.

The torque profile of the energized machine phase equals the combined torque profiles of the first pole sections and the second pole sections, with the torque profile of the second pole sections augmenting the torque profile of the first pole sections proximate both the unaligned and aligned positions. Depending upon the cross-sectional shape and circumferential spacing of the teeth of the second rotor pole sections, the torque profile of the second pole sections may further serve to "flatten" the first pole section torque profile at its peak. As a result, upon energizing consecutive machine phases in succession, a relatively constant output torque is obtained from a machine which is otherwise simple and inexpensive, both in construction and operation.

BRIEF DESCRIPTION OF THE DRAWINGS

Referring to the drawings, wherein like reference numerals are used to designate like elements in each of the several figures.

DETAILED DESCRIPTION OF THE PREFERRED EMBODIMENT (S)

Figure 1:
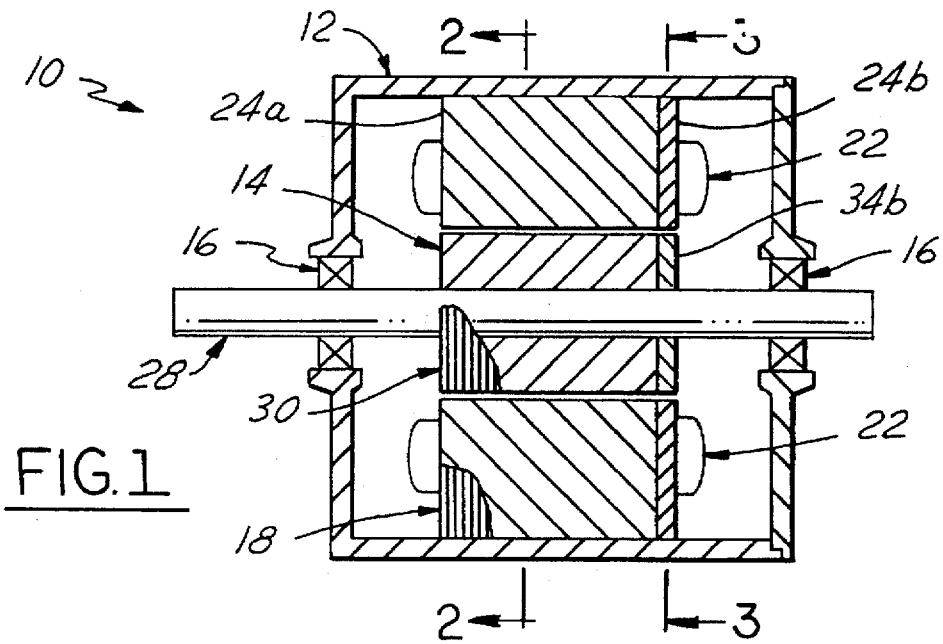
FIG. 1 is a schematic longitudinal view in cross-section of a four-phase switched reluctance motor in accordance with the present invention.

A four-phase switched reluctance motor 10 in accordance with the present invention is shown schematically in FIG. 1 as including a generally annular stator 12, and a rotor 14 which is concentrically supported for rotation within the stator 12 as by bearings 16 secured proximate to the respective longitudinal ends of the stator 12. In the illustrated embodiment, the stator 12 is formed as a laminated stack of a magnetically-permeable material such as iron ("laminations 18").

Figure 2:
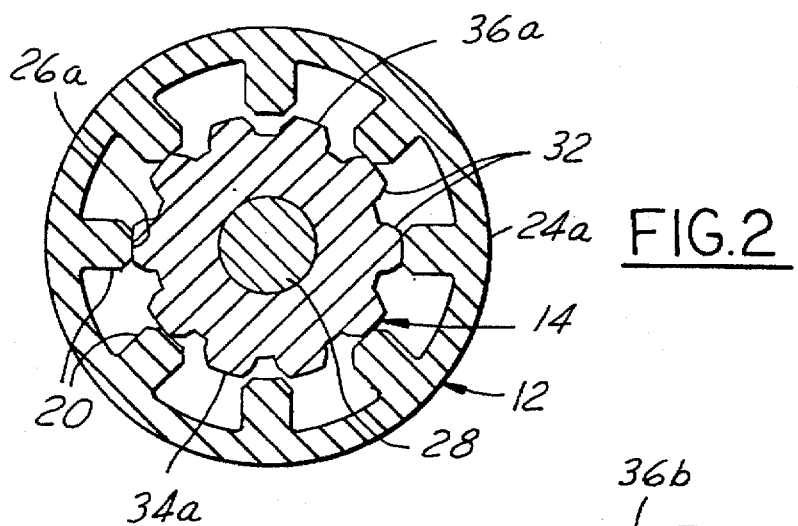
FIG. 2 is a view in cross-section of the motor along line 2—2 of FIG. 1.
Figure 3:
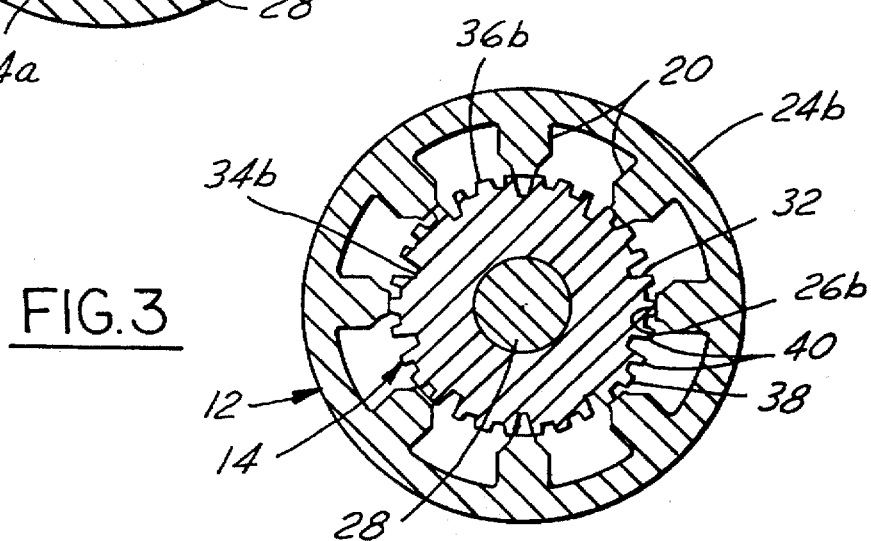
FIG. 3 is a view in cross-section of the motor along line 3—3 of FIG. 1.

As seen more clearly in FIGS. 2 and 3, a plurality of radially-inwardly-extending poles 20 are formed on the stator 12 via radial extensions of the individual laminations 18, deployed about the stator's inner periphery in diametrically-opposed pairs. An electrical conductor is wound about each of the stator poles 20 (shown only in FIG. 1 for clarity), with the resulting stator windings 22 of diametrically opposite stator poles 20 associated with stator 12 being connected in series to form one machine phase. Each machine phase may be energized individually and, when consecutive machine phases are energized in sequence, provides for rotation of rotor 14 within the stator 12. It will be appreciated that, while the stator 12 of the illustrated embodiment is provided with eight poles 20, a greater or lesser number of poles 20 may be provided in any particular machine configuration.

As seen in FIGS. 2 and 3, the shape of the stator's individual laminations 18 and, hence, the poles 20 defined thereby preferably vary along the length of the stator 12 so as to longitudinally divide each stator pole 20 into a first stator pole section 24a and a second stator pole section 24b. Alternatively, the stator 12 may be viewed as being divided longitudinally into a first stator section and a second stator section wherein each stator section has a plurality of poles 20 associated therewith. Further, reference to the first stator pole section 24a, and the second stator pole section 24b can thus be alternatively made as the first stator section and the second stator section, each stator section having a plurality of poles, respectively. Thus, in the illustrated embodiment, the stator's first pole section 24a defines, in radial cross-section, a single "tooth" having a generally rectangular body portion and a narrowly (i.e., slightly) tapered "tip 26a." The stator's second pole section 24b defines, in radial cross-section, a single tooth having a generally rectangular base portion, a widely-tapered intermediate portion and a narrowly tapered "tip 24b." In the illustrated embodiment, the width of the tip 26b of each stator pole 20 along its second section 24b is perhaps about one-sixth of the nominal width of the tip 26a of each stator pole 20 along its first section 24a. The radially-innermost surface of each stator pole 20 is preferably slightly concave so as to define a nominal "bore" within which to receive the rotor 14.

The advantages of varying the cross-sectional shape of each stator pole 20 along the length of the stator 12 and, more particularly, the advantages of the widely-tapered tooth of each stator pole's second sections 24b will be described more fully below.

Referring again to FIGS. 2 and 3, the rotor 14 includes a shaft 28, and a second laminated stack of magnetically-permeable material such as iron ("laminations 30") rigidly mounted on, and rotatable with, the shaft 28. A plurality of radially-outwardly-extending poles 32 are formed on the rotor assembly 14 (via radially-outward extensions of the individual laminations 30), also in diametrical pairs. As noted with respect to the stator 12, the rotor 14 may be provided with a greater or lesser number of poles 32 than the ten such poles 32 of the illustrated embodiment, noting further that, for switched reluctance motors, it is well known to provide a different number of poles 32 on the rotor 14 as is provided on the stator 12.

As in the stator 12, the shape of the rotor's individual laminations 30 vary along the length of the rotor 14 so as to longitudinally divide each rotor pole 32 into a first rotor pole section 34a and a second longitudinal rotor section 34b, respectively. Alternatively, the rotor 14 may be viewed as being divided longitudinally into a first rotor section, and a second rotor section wherein each rotor section has a plurality of poles 32 associated therewith. Further references to the first stator pole section 34a, and the second stator pole section 34b can thus be alternatively made as the first rotor section and the second rotor section, each rotor section having a plurality of poles, respectively. Thus, in the illustrated embodiment, the first rotor section 34a defines, in radial cross-section, a single tooth having a generally trapezoidal shape when viewed in cross-section, with a tapered and slightly radiused "tip 36a." The rotor's second section 34b defines, in radial cross-section, three radially-outwardly-extending teeth 38, 40 at the "tip 36b" of an otherwise generally rectangular body, as will be discussed more fully below in connection with FIGS. 4–6. The radially-outermost surfaces of each rotor pole 32 is preferably slightly convex so as to define an effective outer rotor diameter adapted to be received within, i.e., slightly smaller than the stator assembly's "bore." Thus, as shown in FIG. 2, the poles 32 associated with the first rotor section each comprise one tooth. As shown in FIG. 3, the poles 32 of the second rotor section each comprise three teeth.

Figure 4:
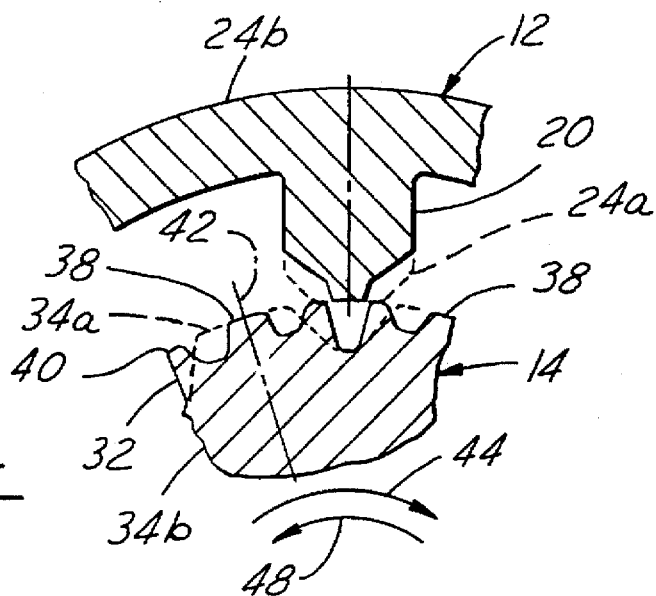
FIG. 4 is an enlarged partial sectional view of the motor showing a second rotor pole section in an unaligned position relative to a second stator pole section of an energized stator phase (with the outline of the first stator and rotor pole sections further shown in phantom line for reference)
Figure 5:
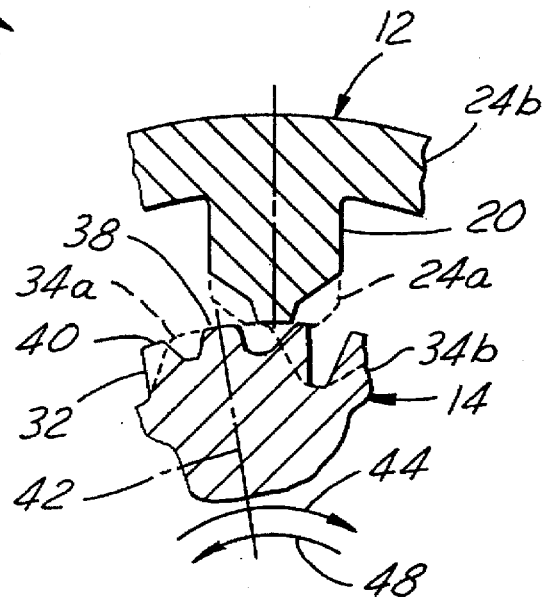
FIG. 5 is an enlarged partial sectional view similar to that of FIG. 4, but with the second rotor pole section in a position intermediate the unaligned position and the aligned position relative to an energized second stator pole section.
Figure 6:
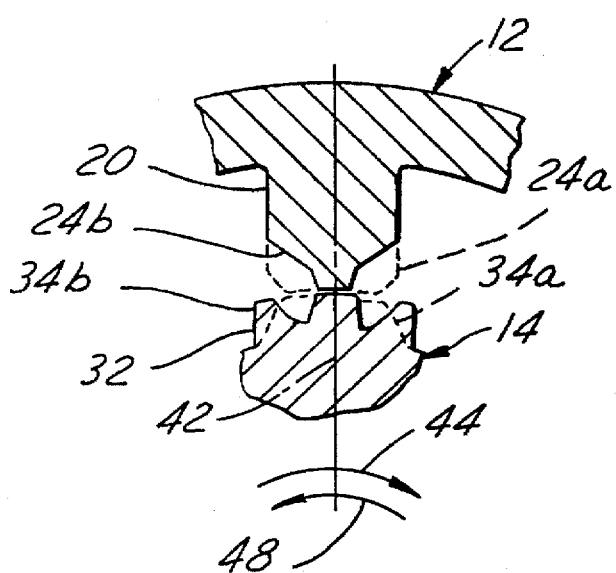
FIG. 6 is an enlarged partial sectional view similar to that of FIG. 4, but with the second rotor pole section in an aligned position relative to an energized second stator pole section.

FIGS. 4–6 are enlarged partial sectional views of the motor 10 showing the second section 34b of a given rotor pole 32 in an unaligned position, an intermediate position, and an aligned position, respectively, with the second section 24b of a given stator pole 20. The tip 36b of each second rotor pole section 34b may be seen to include a central tooth 38 which is itself centered atop the rotor pole 32 along a radial line 42 bisecting the pole 32. The width of the central tooth 38 at its radially-outermost portion is preferably slightly greater than the width of the tip 26b of each stator pole 20 along its second section 24b.

In the illustrated embodiment, the central tooth 38 and each side tooth 40 is further symmetrically shaped relative to radial line 42, with the circumferential spacing between the central tooth 38 and each side tooth 40 atop a given pole 32 being approximately equal to the circumferential spacing between the adjacent side teeth 40 of adjacent poles 32. However, the present invention contemplates a second rotor pole section 34b wherein the circumferential spacing between the teeth 38,40 atop a given pole 32 is substantially equal to the circumferential spacing between the side teeth 40 of adjacent poles 32. As will be discussed more fully below, the gap between the central tooth 38 and each side tooth of a given second rotor pole section 34b need not be symmetrically shaped relative to the gap's own center.

Referring again to FIGS. 4-6, as well as to FIGS. 7 and 8, the advantages of using divided stator and rotor poles 20,32 as described above will now be discussed. In accordance with the present invention, when the divided stator poles 20 of a given machine phase are energized, as through use of a conventional phase sequencer (not shown), the magnetic interaction between the energized stators first pole sections 24a and the first pole sections 34a of the divided rotor poles 32 positioned within 180 electrical degrees thereof (as shown in FIG. 4) generates a torque acting only in a first direction 44 as each first rotor pole section 34a is urged toward an aligned position with its respective energized first stator pole section (as shown in FIGS. 5 and 6). The torque profile generated by the magnetic interaction of the first pole sections 24a, 34a of the stator 12 and rotor 14, plotted as against electrical degrees (with zero electrical degrees representing the unaligned position), appears as plot 46 of FIG. 7.

In accordance with the present invention, as will be appreciated upon review of FIGS. 4-6, the magnetic interaction between the energized stators' second pole sections 24b and the second pole sections 34b of those divided rotor poles 32 (as depicted in FIGS. 4-6) generates a torque acting at times in the first direction 44 and at other times in a second direction 48 opposite the first direction 44 as each second rotor pole section 34b is urged toward alignment with its respective energized second stator pole section 24b.

More specifically, the magnetic interaction between the energized second stator pole section 24b and the second rotor pole section 34b, as the latter is urged from an unaligned position with respect to the former toward an aligned position therewith, is characterized in that the torque first rises, from a near-zero value acting in the first direction proximate the unaligned position (FIG. 4), to a first peak value acting in the first direction 44, then falls to zero value, then rises to a second peak value acting in the second direction 48 (FIG. 5), then falls to zero value, then rises to a third peak value acting in the first direction 44, and then falls to a near-zero value acting in the first direction proximate to the aligned position (FIG. 6). In this regard, it is noted that the magnitude of the second peak value itself depends upon the shape of the gap located between the central tooth 38 and each side tooth 40 of a given second rotor pole section 34b and, particularly the shape of the gap as it defines the face of its respective side tooth 40. The torque profile generated by the magnetic interaction of the second pole sections 24b, 34b of the stator 12 and rotor 14 appears as plot 50 of FIG. 7.

The overall single-phase torque profile generated by the magnetic interaction of the poles 20, 32 of the stator 12 and rotor 14 and, hence, the overall single-phase torque profile for the motor 10 is the sum of the single-phase torque profiles 46,50 of the first stator/rotor pole section 24a, 34a and the second stator/rotor pole sections 24b, 34b. The overall single-phase torque profile for the motor 10 appears as plot 52 on FIG. 7. Review of FIG. 7 confirms that the dual-section motor 10 of the present invention provides a flatter torque profile 40 than a motor employing stator/rotor poles having but one shape in radial cross-section, respectively. It is believed that the second pole sections 24b, 34b need not be more than ten percent of the overall length of the stator/rotor poles 20, 32, respectively, in order to achieve substantive improvements in overall machine output torque as illustrated in FIG. 7.

Figure 7:
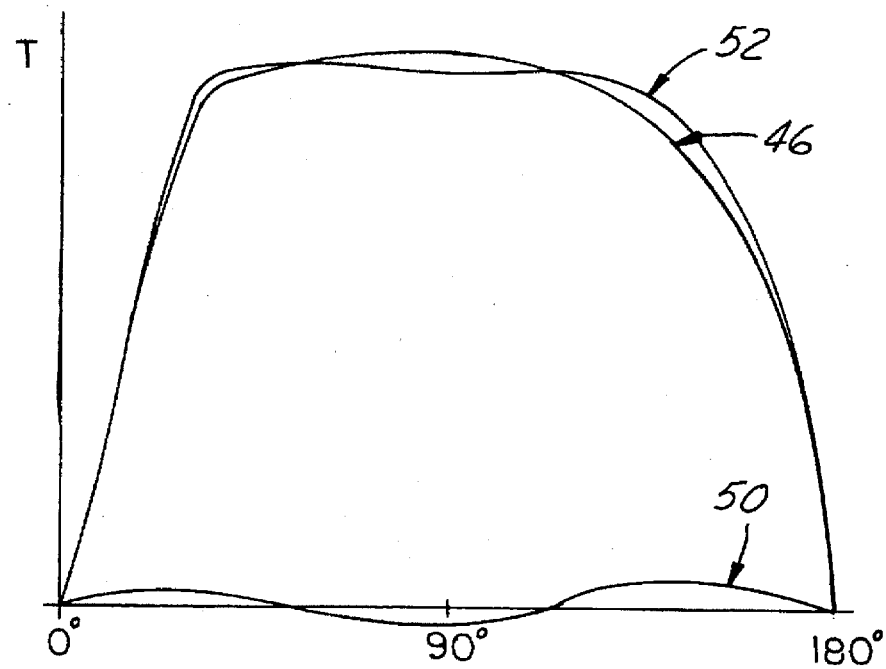
FIG. 7 is a representative plot of the torque profiles generated by the first and second pole sections, individually and in combination, for a given machine phase of the motor of FIG. 1.
Figure 8:
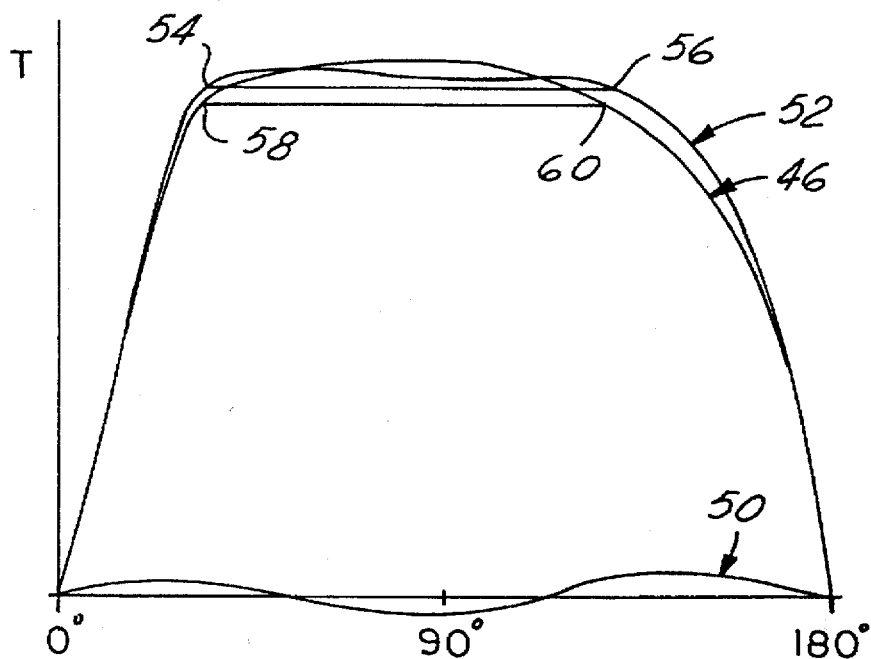
FIG. 8 contains plots identical to those of FIG. 7, further annotated to show overlap with the torque profiles of other phases.

FIG. 8 contains plots 46, 50, 52 identical to those of FIG. 7, further annotated to show overlap with the torque profiles of other phases. Significantly the phase overlap points 54, 56 of the combined torque profile 52 improves over the overlap points 58, 60 of the single (first) section torque profile 46, in that it is more closely centered between the aligned and unaligned positions of the rotor 14 relative to the stator 12 (as represented by 90 electrical degrees on the abscissa of FIG. 8).

While the preferred embodiment of the invention has been disclosed, it should be appreciated that the invention is susceptible of modification without departing from the spirit of the invention or the scope of the subjoined claims. Thus, while the invention was described and illustrated above in the context of a four-phase switched reluctance motor 10, it will be appreciated that the invention may be used in conjunction with any machine having at least two phases (i.e., a selected machine phase to be switched between modes, and a nonselected machine phase to be operated only during a multi-phase mode), as well as in conjunction with other well-known electric machines and/or structures.

I claim:

1. An electric machine comprising: an annular stator divided into a first stator section and a second stator section of respective cross-sectional shape and axially spaced, said first and said second stator sections each having a respective plurality of radially-inwardly-extending poles wherein the shape of the poles of the first stator section is different from the shape of the poles of the second stator section;

a rotor, supported for rotation within said stator, divided into a first rotor section and a second rotor section of respective cross-sectional shape and axially spaced, said first and said second rotor sections each having a respective plurality of radially-outwardly-extending poles wherein the shape of the poles of the first rotor section is different from the shape of the poles of second rotor section; and, wherein the shape of each pole of the first rotor section is characterized by one radially-outwardly-projecting tooth and the shape of each pole of the second rotor section is characterized by three radially-outwardly-projecting teeth.

2. The electric machine of claim 1, wherein the shape of each of the poles of the second rotor section is further characterized in that a first one of said three teeth is centered about a radial line bisecting the rotor pole.

3. The electric machine of claim 2, wherein the shape of each of the poles of the second rotor section is symmetrical about the radial line bisecting the rotor pole.

4. The electric machine of claim 3, wherein the shape of each of the poles of the second rotor section is further characterized in that the respective circumferential spacing between the teeth on a given rotor pole is greater than the circumferential spacing between the adjacent teeth of adjacent rotor poles.

5. The electric machine of claim 2, wherein the shape of each of the poles of the second rotor section is further characterized in that a second tooth and a third tooth of said three teeth extend outwardly the same radial distance as the first one of said three teeth.

6. The electric machine of claim 1, wherein at least one rotor section is formed of a laminated stack of magnetically-permeable material.

7. The electric machine of claim 1, further including means for energizing at least one pole of said first stator section and at least one corresponding pole of said second stator section when at least one pole of said first rotor section and at least one corresponding pole of said second rotor section are within 180 electrical degrees thereof, respectively; and wherein the magnetic interaction between the energized pole of the first stator section and the pole of the first rotor section generates a torque acting only in a first direction as the pole of the first rotor section is urged from an unaligned position with respect to the pole of the first stator section toward an aligned position therewith, and the magnetic interaction between the energized pole of the second stator section and the pole of the second rotor section generates a torque acting at times in the first direction and at other times in a second direction opposite the first direction as the pole of the second rotor section is urged from an unaligned position with respect to the pole of the second stator section toward an aligned position therewith.

8. The electric machine of claim 7, wherein the magnetic interaction between the energized pole of the second stator section and the pole of the second rotor section as the pole of the second rotor section is urged from an unaligned position with respect to the pole of the second stator section toward an aligned position therewith is characterized in that the torque first rises, from a near-zero value acting in the first direction proximate the unaligned position, to a first peak value acting in the first direction, then falls to zero value, then rises to a second peak value acting in the second direction, then falls to zero value, then rises to a third peak value acting in the first direction, and then falls to a near-zero value acting in the first direction proximate to the aligned position.

9. An electric machine comprising:
an annular stator divided into a first stator section and a second stator section axially spaced, each of said stator sections having a respective plurality of radially-inwardly-extending poles, wherein the poles of the first stator section have a different shape in radial cross-section than the poles of the second stator section, the shape of the poles of the second stator section defining a single narrowed tooth; and,
a rotor, supported for rotation within said stator, divided into a first rotor section and a second rotor section axially spaced, each of said rotor sections having a respective plurality of radially-outwardly-extending poles, wherein the poles wherein the poles of the first rotor section have a different shape in radial cross-section than the poles of the second rotor section; and,
wherein the shape of each pole of the first rotor section is characterized by one radially-outwardly-projecting tooth and the shape of each pole of the second rotor section is characterized by a central tooth and a pair of side teeth.

10. The electric machine of claim 9, wherein the central tooth of each pole of the second rotor section is centered about a radial line bisecting the rotor pole.

11. The electric machine of claim 10, wherein the shape of each pole of the second rotor section is symmetrical about the radial line bisecting the rotor pole.

12. The electric machine of claim 11, wherein the circumferential spacing between the central tooth and each side tooth of each pole of the second rotor section is greater than the circumferential spacing between the side teeth of adjacent poles of the second rotor section.

13. The electric machine of claim 9, wherein the side teeth of each pole of the second rotor section extend outwardly the same radial distance as the central tooth thereof.

14. The electric machine of claim 9, wherein at least one of the rotor sections is formed of a laminated stack of magnetically-permeable material.

15. The electric machine of claim 9, wherein the tooth of each pole of the second stator section is centered about a radial line bisecting the stator pole.

16. The electric machine of claim 15, wherein the width of the radially-outermost portion of the central tooth of each pole of the second rotor section is greater than the width of the radially-innermost portion of the tooth of each pole of the second stator section.

17. A rotor for an electric motor comprising:
a shaft;
a first annular rotor section mounted concentrically with said shaft, said first section defining a first plurality of radially-outwardly-extending poles, each of said first plurality of poles having a first shape in radial cross-section characterized by single tooth;
a second annular rotor section mounted concentrically with said shaft and axially spaced from said first rotor section, said second section defining a second plurality of radially-outwardly-extending poles, each of said second plurality of poles having a second shape in radial cross-section characterized by three radially-outwardly-projecting teeth.

18. The rotor of claim 17, wherein one tooth on each of said second plurality of poles is centered about a radial line bisecting each pole.

19. The rotor of claim 18, wherein the second shape is symmetrical about the radial line bisecting each pole.

20. The rotor of claim 19, wherein the circumferential spacing between the teeth of each of said second plurality of poles is greater than the circumferential spacing between the teeth of adjacent poles.

21. The rotor of claim 17, wherein at least one of said first and second rotor sections is formed of a laminated stack of magnetically-permeable material.

22. The rotor of claim 17, wherein the first plurality of poles on the first rotor section are axially aligned with the second plurality of poles on the second rotor section.

23. The rotor of claim 17, wherein the length of the second rotor section is less than about ten percent of the combined lengths of the first and second rotor sections.

24. An electric machine comprising:
an annular stator divided into a first stator section and a second stator section of respective cross-sectional shape and axially spaced, said first and said second stator sections each having a respective plurality of radially-inwardly-extending poles wherein the shape of the poles of the first stator section is different from the shape of the poles of the second stator section; and,
a rotor, supported for rotation within said stator, divided into a first rotor section and a second rotor section of respective cross-sectional shape and axially spaced, said first and said second rotor section each having a respective plurality of radially-outwardly-extending poles wherein the shape of the poles of the first rotor section is different from the shape of the poles of the second rotor section; and,
wherein the shape of each pole of the second rotor section is characterized by three radially-outwardly-projecting teeth.

* * * * *

UNITED STATES PATENT AND TRADEMARK OFFICE
CERTIFICATE OF CORRECTION

PATENT NO.   : 5,668,430
DATED        : September 16, 1997
INVENTOR(S)  : Kolomeitsev It is certified that error appears in the above-indentified patent and that said Letters Patent is hereby corrected as shown below:

Column 6, line 45, after "of" please insert --the--

Column 7, line 49, please cancel the first occurrence of "wherein the poles"

Signed and Sealed this

Eighteenth Day of November 1997

Attest:

BRUCE LEHMAN

Attesting Officer

Commissioner of Patents and Trademarks